No. 679,440. Patented July 30, 1901.
W. TEMPEST.
TONGS.
(Application filed May 11, 1901.)
(No Model.) 2 Sheets—Sheet 1.

Witnesses:
Walter Samaries
Fred D. Sweet

Inventor:
Wandell Tempest
By Kay & Totten
Attorneys

No. 679,440. Patented July 30, 1901.
W. TEMPEST.
TONGS.
(Application filed May 11, 1901.)
(No Model.) 2 Sheets—Sheet 2.
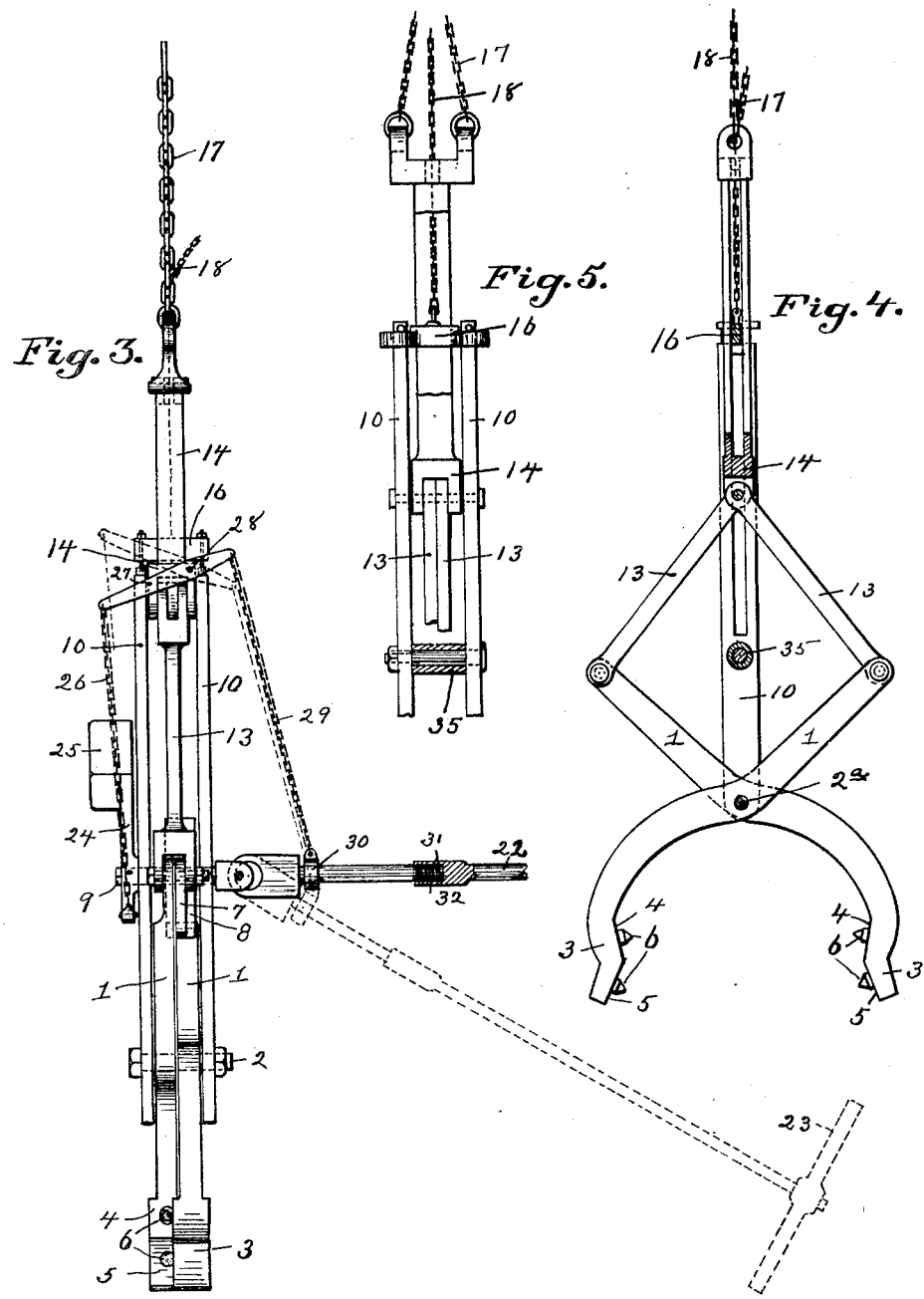
Witnesses:
Inventor:
Wardell Tempest
By Kay & Totten
Attorneys.

UNITED STATES PATENT OFFICE.

WARDELL TEMPEST, OF HOMESTEAD, PENNSYLVANIA.

TONGS.

SPECIFICATION forming part of Letters Patent No. 679,440, dated July 30, 1901.

Application filed May 11, 1901. Serial No. 59,748. (No model.)

*To all whom it may concern:*

Be it known that I, WARDELL TEMPEST, a resident of Homestead, in the county of Allegheny and State of Pennsylvania, have invented a new and useful Improvement in Tongs; and I do hereby declare the following to be a full, clear, and exact description thereof.

My invention relates to tongs for use in mills, and is especially adapted for picking up hot metal ingots, billets, blooms, or slabs.

One object of my invention is to provide a tongs for this purpose which has a very wide expansion, so as to adapt it to pick up not only small and narrow billets, but also very wide slabs, and which is adapted to be operated either by hand or automatically.

A further object of my invention is to provide a tongs of this kind wherein the jaws may be operated to drop the body either by rotating and handling or using the same as a lever, said handle being also constructed so that one part thereof may rotate independently of the other.

A further object of my invention is to provide a special form of grasping-jaws for tongs whereby the same is adapted to readily grasp either a narrow or a very wide body, and generally to improve the construction of tongs of this general character.

Figure 1:
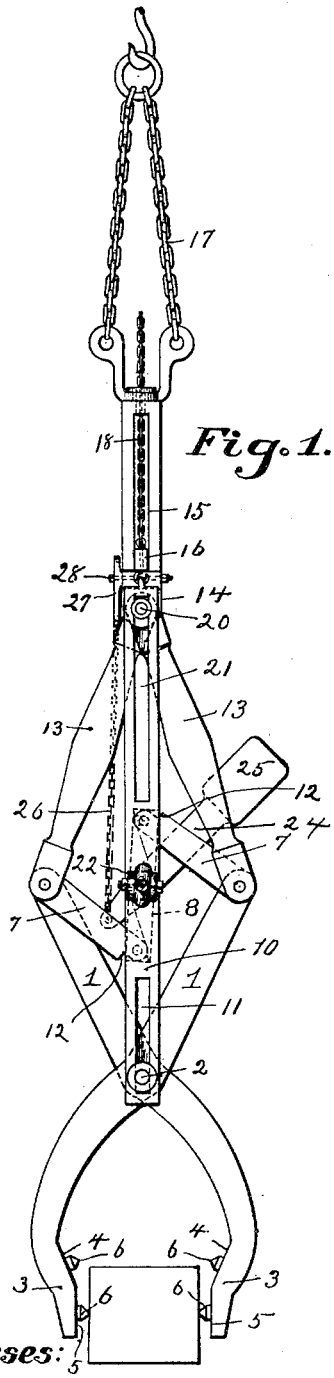
Figure 2:
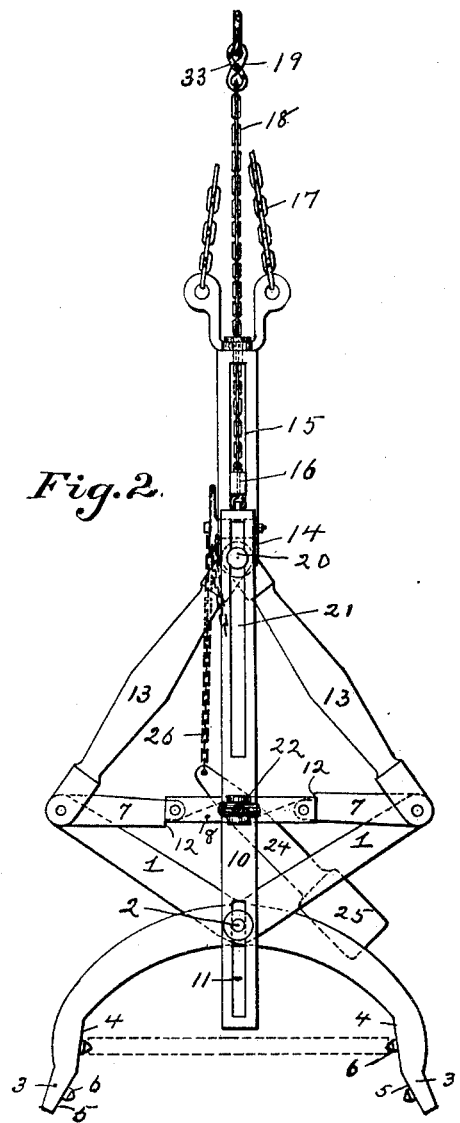

In the accompanying drawings, Figure 1 is a front view of my improved tongs, showing the same grasping a comparatively narrow billet or bloom. Fig. 2 is a similar view of the tongs, showing the jaws expanded to their fullest extent. Fig. 3 is a side view of the tongs. Fig. 4 is a front view of the tongs without the hand operating means, and Fig. 5 is a side view of the upper part of the latter.

My tongs comprise the usual tong-levers 1, which are pivoted to each other at 2 and which are extended to form the jaws 3, said jaws being curved, as shown, and having portions extending toward each other and the outer ends projecting outward, thereby providing two faces 4 and 5 at an angle to each other, each of said faces being provided with a tooth or stud 6 and said faces being so formed on the jaws 3 that when the latter are fully expanded the studs or teeth 6 on the faces 4 will project toward each other in direct line, as shown in Fig. 2, so as to grasp a slab or other wide body, and the faces 5 extend outward at an angle therefrom, so that when the jaws are partly closed for grasping narrow bodies, as shown in Fig. 1, the studs or teeth 6 on the faces 5 will be in line with each other.

The upper or the outer ends of the tong-levers 1 are pivotally connected by means of rods 7 to the opposite ends of a link 8, said link being secured to a short shaft 9, which is rotatably mounted in the side bars or frames 10, which side bars or frames are provided at their lower ends with slots 11, in which the ends of the pivot 2 slide and are guided. The rods 7 are provided with shoulders 12, which abut against the ends of the link 8 and prevent the latter from passing beyond the horizontal position shown in Fig. 2 and permit the same to be rotated only in one direction to the position shown in Fig. 1. The outer ends of the tong-levers 1 are also pivotally connected by the rods 13 to the lower end of a block 14, said block being slotted, as at 15, through which slot passes the cross-bar 16, which unites the upper ends of the side bars 10. This sliding block 14 has connected to its upper end a double chain 17, whereby it is connected to the jib or crane. The said block is also provided with a central opening through which passes the single chain 18, which is connected at its lower end to the cross-bar 16 of the frame, and at its upper end is provided with a detachable link 19 for securing it to the jib or crane. The pivot 20, which connects the rods 13 to the block 14, slides and is guided in slots 21, formed in the upper ends of the side bars 10.

One end of the shaft 9 has pivotally secured thereto the inner end of a handle 22, the outer end of which handle is provided with the cross-arms 23, whereby the said shaft 9 and link 8 may be rotated to open and close the tongs. The opposite end of said shaft 9 is squared and provided with the arm 24, which is provided at one end with a counterweight 25 and has its opposite end connected by a chain 26 to the long arm of the lever 27, pivoted at 28 to the block 14. The short arm of said lever 27 is connected by a chain 29 to a sleeve 30, which encircles the handle 22, so that the latter may freely rotate in said sleeve.

In the operation of the tongs thus far described when the same are to be operated entirely by hand the said tongs are suspended from the jib or crane by the double chain 17, and the single chain 18, connected to the upper end of the frame, is omitted. In order to grasp a billet, ingot, or other body, the handle 22 is rotated to turn the link 8, thereby opening the tongs, and then by turning said handle in the opposite direction the tongs will close to grasp the object. In opening the tongs the pivot 2 thereof rides upward in the slot 11 in the side frame 10 to the position shown in Fig. 2, thereby giving a much wider expansion of the jaws than would be possible if the pivot 2 had not the slotted connection with said frame, and when the tongs are being closed the said pivot 2 will again ride downward in said slot. In order to release the grasp of the tongs on the body, the handle 22 may either be rotated to rotate the link 8 or the said handle may be used as a lever—that is, by bearing down on said handle the same will act as a lever—thereby drawing down on the chain 29, and through the lever 27 and chain 26 and arm 24, rotating the link 8, thereby accomplishing the same object that would be accomplished by rotating the handle 22. This is of especial importance in cases where the operator has but a single hand available for opening the tongs, in which event it is difficult to rotate the handle 22 directly, but it will be comparatively easy to use the handle as a lever. In this event the rotation of the link 8 and its shaft will necessarily communicate rotation to the handle 22, and as the turning of said handle in the hand of the operator when used as a lever would be unpleasant the said handle is made in two parts, as shown, one of which parts is provided with a screw-tapped socket 31 and the other with a screw-threaded shank 32, fitting in said socket, so that the inner portion of said handle may rotate with the link 8 without rotating the outer part, the shank 32 merely unscrewing slightly in the socket 31. The screw-threads are cut in such direction that when the handle 22 is turned to rotate the link 8 the parts will be screwed tightly together. In place of this screw-and-socket connection any convenient ratchet connection might be used whereby one of said parts could rotate independent of the other in one direction, but in the opposite direction would have to rotate therewith.

In case the tongs are to operate automatically both chains 17 and 18 are used; but the tongs will be carried normally by the double chain 17, connected to the upper end of the block 14, which block is connected, through the links 13, to the outer ends of the tong-levers 1, and when thus carried the tongs automatically take the closed position—as, for instance, when carrying a billet or ingot. In order to release said billet or ingot, the tongs are suspended by the single chain 18 and the double chain 17 is slacked, so that then the tongs will be supported by the cross-frame 16, leaving the block 14 free, which descending by gravity will, through the arms 13, push outward on the tong-levers 1 and open the tongs. In order to permit the ready connection and disconnection of the chain 18 to the jib or crane, the detachable link 19 is provided, the body of said link being of substantially S shape and having pivoted centrally therein the tongue 33, which is adapted to close both of the openings in said link, as will be readily understood. When using the tongs in this manner, the rods 7, link 8, shaft 9, operating-handle 22, arm 24, lever 27, and chains 26 and 29 are not necessary and may be removed, if desired. Furthermore, in this use of the tongs the pivot-point 2 will not ride up and down in the slots 11 and said slots may be omitted; but the pivot 20, which connects the arms 13 to the block 14, will ride up and down in the slots 21. In Fig. 4 I have illustrated the tongs slightly modified, so as to involve only the automatic operating principle thereof, and in this case the tong-levers 1 are pivoted fixedly in the side bars 10, as at $2^a$, and all of the hand operating devices are removed, the side frames 10 being strengthened by the cross-piece 35, as shown. In this modification the double chain 17, connected to the block 14, and the single chain 18, connected to the cross-bar 16, are of course used, and the block 14 is connected by the links 13 to the outer ends of the tong-levers 1.

It will thus be seen that I have provided tongs for the purposes stated wherein the jaws can be given a very wide expansion in order to grasp and carry wide plates, said jaws being provided with two pairs of gripping-faces to adapt them either to a narrow or wide object and said tongs being capable of being operated either automatically from the jib or crane or by hand means and said hand means being so constructed as to permit the operation of the tongs either by rotating a handle or using the same as a lever.

What I claim as my invention, and desire to secure by Letters Patent, is—

1. In billet-tongs, the combination of the pivoted tong-levers having gripping-jaws, a link, rods pivotally connecting the levers and link, a frame in which the parts are mounted, the arrangement being such as to permit the pivot of the tong-levers to move toward and from the link, and means for rotating the link.

2. In billet-tongs, the combination of the pivoted tong-levers having gripping-jaws, a link, rods pivotally connecting the levers and link, a frame in which the link is rotatably mounted, slotted connections between said frame and the pivot of the tong-levers, and means for rotating the link.

3. In billet-tongs, the combination of the pivoted tong-levers having gripping-jaws, a link, rods pivotally connecting the levers and link, suspending means connected to the levers, a frame in which the parts are mounted, the arrangement being such as to permit the suspending means to move toward and from the link, and means for rotating the link.

4. In billet-tongs, the combination of the pivoted tong-levers having gripping-jaws, a link, rods pivotally connecting the levers and link, suspending means connected to the levers, a frame in which the link is rotatably mounted, slotted connections between said frame and the suspending means, and means for rotating the link.

5. In billet-tongs, the combination of the pivoted tong-levers having gripping-jaws, a link, rods pivotally connecting the levers and link, suspending means connected to the tong-levers, a frame in which the link is rotatably mounted, slotted connections between said frame and the pivot of the tong-levers and the suspending means, and means for rotating the link.

6. In billet-tongs, the combination of the tong-levers having gripping-jaws, a frame in which the same are mounted, means for suspending the frame, and other suspending means connected to the tong-levers.

7. In billet-tongs, the combination of the pivoted tong-levers having gripping-jaws, a frame in which the same are mounted, suspending means connected to the frame, a block, suspending means connected thereto, rods pivotally connecting the block and levers, and slotted connections between the block and frame.

8. In billet-tongs, the combination of the pivoted tong-levers having gripping-jaws, a link, rods pivotally connecting the levers and link, a frame in which the parts are mounted, suspending means connected to the frame, other suspending means connected to the tong-levers, and means for rotating the link.

9. In billet-tongs, the combination of the pivoted tong-levers having gripping means, a link, rods pivotally connecting the levers and link, a frame in which the same are mounted, means for suspending the frame, a block, suspending means connected thereto, rods pivotally connected to the block and levers, slotted connections between the block and frame, and means for rotating the link.

10. In billet-tongs, the combination of the pivoted tong-levers having gripping-jaws, a link, rods pivotally connecting the levers and link, suspending means connected to the tong-levers, a frame in which the link is rotatably mounted, slotted connections between said frame and the pivot of the tong-levers and the suspending means for the levers, suspending means connected to the frame, and means for rotating the link.

11. In billet-tongs, the combination of the tong-levers having gripping-jaws, a link, rods pivotally connecting the levers and link, a handle hinged to the link for rotating the same, and other connections between the link and lever whereby the handle may be used as a lever to rotate the link.

12. In billet-tongs, the combination of the tong-levers having gripping-jaws, a link, rods pivotally connecting the levers and link, a handle pivotally connected to the link for rotating the same, an arm also connected to the link, and connections between the handle and arm whereby the handle may be used as a lever to rotate the link.

13. In billet-tongs, the combination of the tong-levers having gripping-jaws, a link, means for suspending the tongs, rods pivotally connecting the link and levers, a handle pivoted to the link for rotating the same, a lever pivoted to the suspending means, and connections between said lever and the handle and said lever and the link whereby the handle may be used as a lever to rotate the link.

14. In billet-tongs, the combination of the tong-levers having gripping-jaws, a link, rods pivotally connecting the levers and link, means for suspending the tongs, a handle pivoted to the link for rotating the same, an arm also connected to the link, a lever pivoted to the suspending means, and connections between the arm and lever and between the lever and handle whereby the latter may be used as a lever to rotate the link.

15. In billet-tongs, the combination of the pivoted tong-levers having gripping-jaws, a link, rods, pivotally connecting the levers and link, a handle connected to the link for rotating the same, said handle being formed in two parts united by means which permit one of said parts to rotate independently of the other in one direction.

16. In billet-tongs, the pivoted tong-levers having gripping-jaws, said jaws having their ends projecting toward each other and then projecting outward, thereby providing two pairs of gripping-faces at an angle to each other.

In testimony whereof I, the said WARDELL TEMPEST, have hereunto set my hand.

WARDELL TEMPEST.

Witnesses:
F. W. WINTER,
ROBERT C. TOTTEN.